Figure 1:
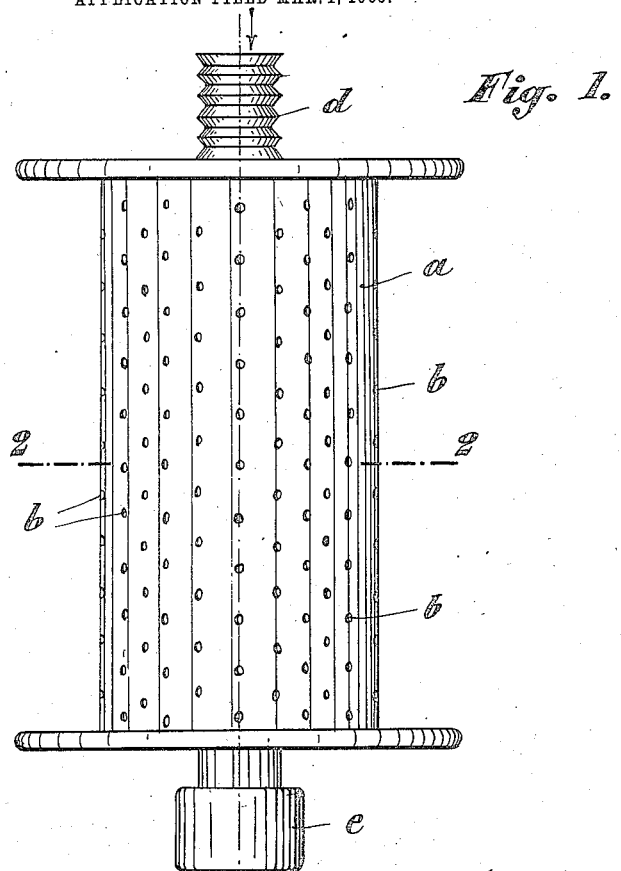

No. 842,568. PATENTED JAN. 29, 1907.
R. LINKMEYER.
PROCESS FOR MANUFACTURING GLOSSY CELLULOSE THREADS.
APPLICATION FILED MAR. 1, 1905.

Witnesses:
O. F. Nagle.
L. Douville.

Inventor:
Rudolf Linkmeyer,
By Diedersheim & Fairbanks,
Attorneys.

UNITED STATES PATENT OFFICE.

RUDOLF LINKMEYER, OF HERFORD, GERMANY.

PROCESS FOR MANUFACTURING GLOSSY CELLULOSE THREADS.

No. 842,568.   Specification of Letters Patent.   Patented Jan. 29, 1907.

Application filed March 1, 1905. Serial No. 247,998.

*To all whom it may concern:*

Be it known that I, RUDOLF LINKMEYER, a subject of the Emperor of Germany, residing at Herford, Province of Westphalia, Germany, have invented a new and useful Process for Manufacturing Glossy Cellulose Threads, of which the following is a specification.

The present invention relates to a process for manufacturing glossy cellulose threads and the product thus formed.

Numerous processes are known the object of which is to manufacture brilliant threads resembling silk by means of solutions of cellulose in ammoniacal oxid of copper. The oldest of these processes is that of Despeissia, in accordance with which threads are obtained by causing the discharge under pressure of a cupro-ammoniacal solution of cellulose through capillary orifices into liquids capable of precipitating the dissolved cellulose in Schweitzer's reagent. Publications designate as such liquids the acids, the alcohols, the solutions of sugar and of salt, and the fixed alkalies. On the other hand, the elimination of the salts with which the thread remains charged after it leaves the precipitation-bath is generally effected in a well-known manner by submitting the thread to the action of acid diluted to about from ten to thirty per cent. Whatever liquid is employed for the precipitation the thread obtained generally lacks strength, especially in the moist condition. This remark is particularly applicable to threads obtained by precipitation in acetic acid or in a relatively concentrated acid of from thirty to sixty-five per cent. The reason for this want of strength would appear to be due to a sort of decomposition produced by the presence of free ammonia in the solutions before the precipitation or in the precipitated threads at the moment at which they are to be submitted to the acid washing. Although the harmful effects of this decomposition have already been noted, hitherto the cause has never been recognized. When fixed alkalies are employed for effecting the precipitation, the threads obtained present an opaque appearance, which is apparently likewise attributable to the effects of this decomposition, and it is probably owing to this opacity that the employment of alkaline liquids for the precipitation has not become general, because it had already been noticed that they produced stronger threads. This peculiarity has been utilized in the manufacture of a kind of felt. (English Patent No. 3,164 of 1899.)

If soda or potash lyes are employed for the precipitation-bath, merely a coagulation is produced, part of the ammonia passing into the precipitation-bath, and after the washing of the threads with acid it is found that they are stronger than those precipitated in acids. If, however, immediately after leaving the precipitation-bath the ammonia still contained in the threads is eliminated as completely as possible before freeing them from the oxid of copper that they still contain by a washing with dilute acid, their strength will be largely increased and the decomposition referred to above will not take place.

The elimination of the copper by washing is effected particularly readily when the oxid of copper has been converted into a salt dissolving readily in acids—for example, into carbonate of copper.

In order to eliminate the ammonia from the freshly-formed threads, they may be treated by means of air, which produces the evaporation of the ammonia and precipitates the copper as hydroxid, a portion of which is then converted into carbonate by the carbonic acid in the air. For example, the threads are wound upon a cylinder arranged outside the precipitation-bath, and which may be perforated and arranged in such a manner as to permit an injection or suction of air through the layers of thread. When the threads have been precipitated in a soda-lye, for example, they leave it with a blue and transparent appearance, and by means of the treatment described above they gradually assume a pale-blue tint and become opaque, and when their appearance no longer undergoes modification they are in the most favorable state for being submitted to washing with dilute acids, which imparts to them the transparency of glass and removes their coloration. They may be then dried, after having been submitted to a second washing, if desired.

In the drawings I have shown a construction which may be employed in carrying out my process, in which—

Figure 2:
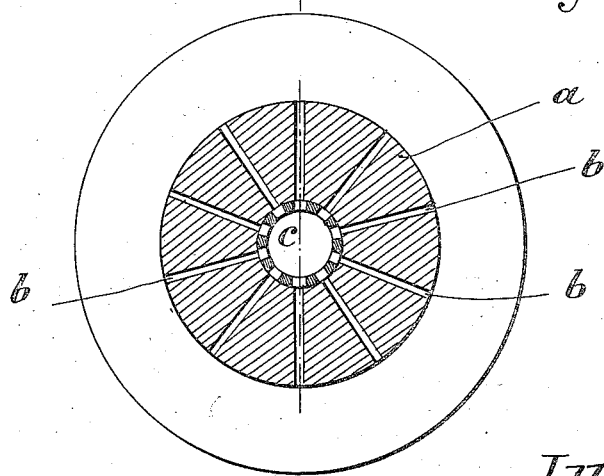

Figure 1 is a plan view of the device; and Fig. 2, a sectional view on line 2 2, Fig. 1.

*a* is the cylinder upon which the threads are wound.

*b* are radial holes, and *c* a central opening into which is fitted a pipe *d*, also perforated with corresponding holes, and one end of which is closed by a stopper e.

Air injected or exhausted through the pipe d passes through and dries the layers of thread wound upon the cylinder a.

What I claim as my invention, and desire to secure by Letters Patent, is—

1. In the manufacture of silk-like threads by causing solutions of cellulose in ammoniacal oxid of copper to issue through capillary orifices into solutions of fixed salts or alkalies, eliminating the free ammonia from the threads and converting the oxid of copper contained in the same into a salt easily soluble in acids and subsequently washing the threads with diluted acids.

2. In the manufacture of silk-like threads by causing solutions of cellulose in ammoniacal oxid of copper to issue through capillary orifices into solutions of fixed salts or alkalies, removing the free ammonia from the threads and converting the oxid of copper contained in the said threads into carbonate of copper and subsequently washing the threads with diluted acids.

3. In the manufacture of silk-like threads by causing solutions of cellulose in ammoniacal oxid of copper to issue through capillary orifices into solutions of fixed salts or alkalies, winding the threads upon a perforated cylinder arranged outside the precipitation-bath and causing air to pass through the layers of thread previously to washing the latter with diluted acids.

In testimony whereof I affix my signature in presence of two witnesses.

RUDOLF LINKMEYER.

Witnesses:
GREGORY PHELAN,
MAURICE GERBCAULT.